United States Patent [19]
Bezu

[11] 3,762,795
[45] Oct. 2, 1973

[54] OBSERVATION INSTRUMENT WITH PANORAMIC VISION

[75] Inventor: Maurice Bézu, Croissy, France

[73] Assignee: Societe d'Etudes & de Realisations Electroniques, Ashieres, France

[22] Filed: June 14, 1971

[21] Appl. No.: 152,890

[30] Foreign Application Priority Data
July 1, 1970 France .............................. 7024400

[52] U.S. Cl. .................... 350/16, 350/38, 356/149, 356/248
[51] Int. Cl. .......................................... G02b 23/08
[58] Field of Search ................ 350/16, 38; 356/149, 356/248, 250

[56] References Cited
UNITED STATES PATENTS
3,558,212   1/1971   Ritchie................................. 350/16

FOREIGN PATENTS OR APPLICATIONS
1,428,729   8/1964   Germany .............................. 350/16
1,563,217   3/1969   France................................. 350/16

Primary Examiner—David H. Rubin
Attorney—Richard Low

[57] ABSTRACT

An observation instrument with panoramic vision, stabilized by a gyroscopic system having inner and outer gimbals which provide corresponding rotation axes, capable of providing accurate data on the elevation and azimuth angles of the boresight and having a fixed eyepiece, characterized by the fact that its optics include two mirrors referenced to the gyroscopic system, to wit a first front plane mirror fixed directly to the inner gimbal of said gyroscopic system, set at a fixed incidence angle, having a plane parallel to the outer gimbal axis of the gyroscopic system and inclined at 45° to the inner gimbal axis of said system, and a second plane mirror referenced to the relative motion of the gyroscopic system about its outer gimbal axis, the plane of said second mirror being so disposed that it furnishes an image of said inner gimbal axis coaxially with an axis about which maximum deflection is obtained for the boresight, and a selective magnification lens system arranged between said mirrors.

14 Claims, 8 Drawing Figures

Fig. 1.

MAURICE BÉZU

MAURICE BÉZU

OBSERVATION INSTRUMENT WITH PANORAMIC VISION

The present invention relates to an observation instrument with panoramic vision the boresight of which is stabilized gyroscopically in order to insulate it from parasite motion due to movement or vibration of the supporting means (which more specifically may be a vehicle travelling through the air, on land or on water).

Target acquisition and subsequent accurate guidance over long distances of missiles launched from a moving vehicle against hostile stationary or moving targets imply the need for the aiming element of the observation instrument to possess great stability and to be so controllable as to allow the boresight to be deflected independently of any motion of the carrier vehicle in order to enable the image of a distant target to be acquired and held motionless in the focal plane of the observation instrument. Since hostile targets can appear from any direction, it is of course imperative for the watching observer to be able to explore the entire surrounding space and to be able to move the direction of his optical boresight at very high speed in order to acquire a designated target. In order to permit automatic fire control, the observation instrument must be capable of accurately and continuously supplying data concerning the azimuth and elevation angles of the boresight which is kept aimed at the target.

Certain prior art gyrostabilized observation instruments include a front mirror pivotally mounted on a horizontal shaft which is mechanically coupled to the inner gimbal axis of the gyroscope by mechanical means providing a demultiplication in the ratio of two to one.

However, because the bearings about which the mirror rotates are supported on the outer gimbal of the gyroscope, the mirror is not constrained to follow the relative motion of the inner gimbal, thereby causing the inertia of the gyroscope-mirror compound to vary with the elevation angle and accordingly often making it necessary to provide an inertia compensator to ensure good stability.

An arrangement of this kind (a mirror, mechanical demultiplication and inertia compensation) increases the inertia of the gyroscope and consequently diminishes it nutation frequency. A very flexible suspension between the observation instrument and the vehicle can filter out the vibration about this nutation frequency but has the disadvantage of preventing the direction of the boresight in relation to the reference axes of the vehicle to be determined with precision. With the aim of connecting the front mirror to the gyroscope directly, other observation instruments employ an anamorphic type of optical system which is positioned before the front mirror and produces an optical demultiplication ratio of two to one.

However, a device of this kind restricts the field of exploration in azimuth to the instantaneous field of the optics.

The drawback which such observation instruments have in common is that their field of exploration is limited by the total deflection of the front mirror. In order to provide panoramic vision in azimuth, both the observation instrument and the observer must be moved simultaneously about a vertical axis.

It is the object of the present invention to overcome these drawbacks and to accordingly provide :

— a fixed observation instrument with stabilized panoramic vision capable of accurately furnishing boresight elevation and azimuth angular data for processing by a fire-control computer :

— an observation instrument which is mounted on the moving and vibrating structure either directly or through the medium of a very rigid suspension system, by providing a gyroscopic unit having a high nutation frequency ;

— a finder head which is referenced to the positions of the gyroscope whereby to utilize a precession torquer the stator of which is supported by the finder head and not the gyroscope and to equip the gyroscope with positional error sensors of very low weight operating within a very small range about the null position ;

— optics in which the front mirror of small weight and size is fixed directly on to the gyroscope, while retaining the possibility of obtaining several different magnifications with the same eyepiece-ring, as well as panoramic vision, the eyepiece remaining fixed ;

— the ability to effect switching from a second fire-control post in order to enable the boresight to be trained very rapidly on to a target seen by a second observer.

The description which follows with reference to the accompanying non-limitative exemplary drawings will give a clear understanding of how the invention can be carried into practice.

Figure 1:
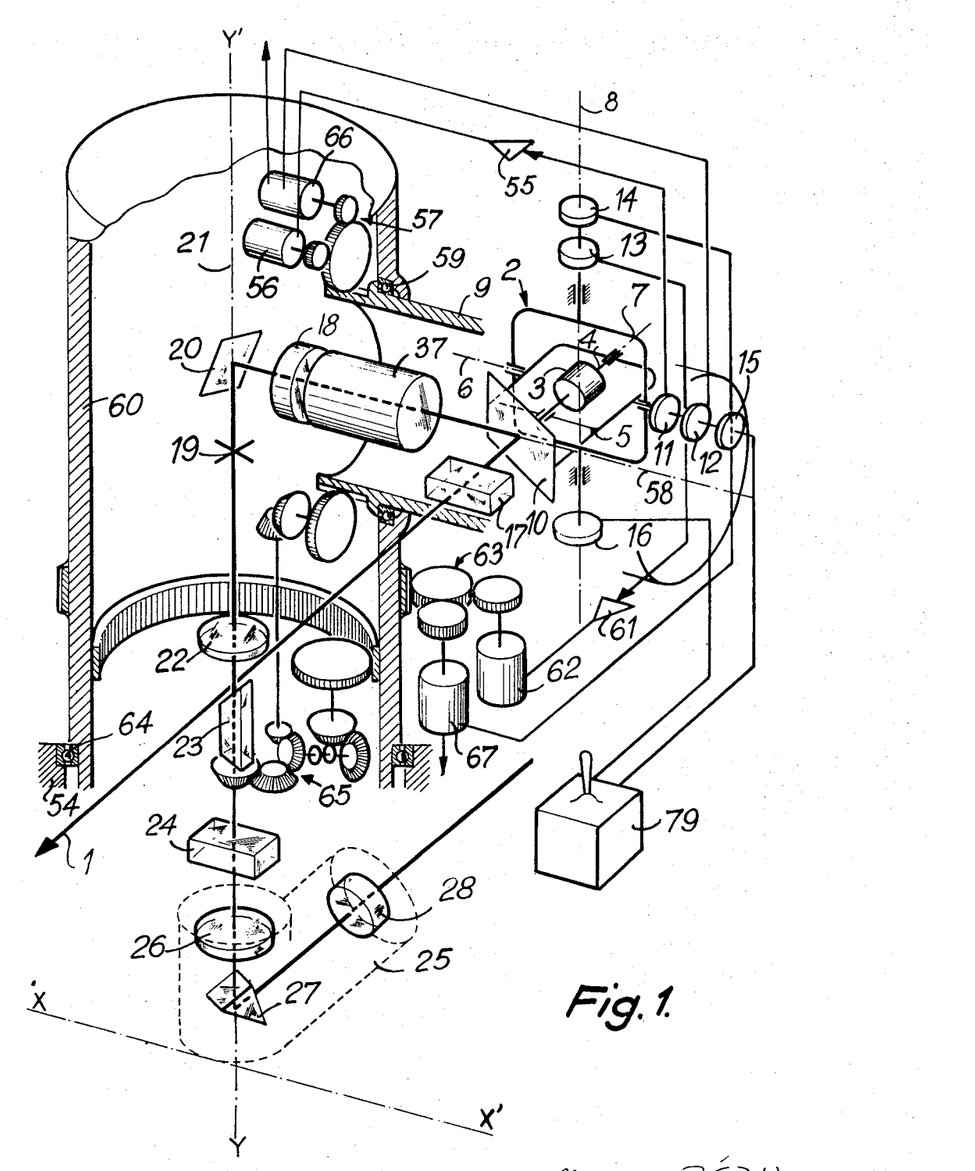
FIG. 1 is a highly schematic perspective view of the basic components of an observation instrument according to a first embodiment of this invention.

As shown in FIG. 1, the boresight 1 of the observation instrument is stabilized by a gyroscipe 2 comprising a wheel 3 rotated at very high speed in a Cardan-type assembly giving it 2° of freedom. Wheel 3 rotates about an axis 4 in a first or inner gimbal 5 capable of pivoting about an axis 6 in a second or outer gimbal 7. Outer gimbal 7 is itself pivotally mounted about an axis 8 inside a case 9. The axes 6 and 8 are mutually perpendicular by design, and the axes 6, 8 and 4 are at all times mutually perpendicular, axis 4 being parallel to boresight 1.

Fixed to the inner or elevation gimbal 5 is a front mirror 10. Preferably, in order to balance the gyroscope 2 equipped with mirror 10 perfectly, the axis 6 about which inner gimbal 5 pivots may be shifted by a certain distance to the rear of the intersection point of axes 4 and 8. This way of balancing the gyroscope without adding additional counterweights avoids increasing the weight of the gyroscope and consequently reduces its nutation frequency.

Mounted on the inner gimbal shaft 6 of gyroscope 2 are two angular deviation sensors 11 and 12 and, on outer gimbal shaft 8, two further sensors 13 and 14. Torquers 15 and 16 are mounted on shafts 6 and 8 respectively.

In accordance with a preferred embodiment, the optical system of the observation instrument includes :

— A front mirror 10 coupled to gyroscope 2 ; the plane of mirror 10 is parallel to the outer gimbal axis 8 and forms an angle of 45° with inner gimbal axis 6, whereby the boresight 1 is at all times co-extensive with the rotation axis 4 of gyroscope wheel 3, the image of which axis from mirror 10 merges with the inner gimbal axis 6 ;

— An afocal anamorphic optical system 17 placed before front mirror 10 and referenced to the relative motion thereof, whereby to cause its optical axis to be co-extensive with the boresight 1 ; the magnification provided by afocal anamorphic system 17 is of two along the plane containing inner gimbal axis 6 of gyroscope 2 and of unity along the plane perpendicular to said plane and containing the outer gimbal axis 8 of gyroscope 2 ;

— A main objective 18, at the image focal plane of which is a reticle 19 which materializes the boresight 1;

— A second plane mirror 20 referenced to the relative motions of gyroscope 2 about its outer gimbal axis 8 ; the plane of mirror 20 is so positioned as to cause the image of the outer gimbal axis 6 of gyroscope 2 formed by mirror 20 to be co-extensive with the axis about which it is desired to obtain maximum rotation, to wit vertical axis 21 in FIG. 1 ;

— A second objective 22 the object focal plane of which is in the same plane as reticle 19 ; preferably, reticle 19 may be formed of concentric circles in order to avoid having to restrain it about axis 21 ;

— An erecting prism 23 rotating about optical axis 21 ; this prism, which is of the Wollaston or Péchan type, is slaved to the rotational movements of front mirror 10 about inner axis 6 and to those of plane mirror 20 about axis 21 whereby to eliminate run-out of the image of the scene being observed, which run-out is caused by the combined rotations of mirrors 10 and 20 ;

— A second anamorphic optical system 24 positioned along the optical path of the observation instrument, behind front mirror 10, whereby to eliminate the anamorphic effect and permit visual observation.

In a preferred embodiment shown in FIG. 1, the anamorphic optical system 24 is positioned after the erecting prism 23. Obviously, it could be placed immediately after the front mirror 10 provided that it is slaved to the movements thereof about inner gimbal axis 6.

In cases where the images of the scene under observation are retransmitted by a television circuit, the anamorphic effect can be eliminated by modifying the sweep of the dissector tube. Similarly, if the images having undergone anamorphosis are recorded by a motion-picture camera, the anamorphic effect can be eliminated upon projection, the projector being equipped to that end with an anamorphic optical system.

The second anamorphic optical system 24 is placed in the optical path, perpendicular to the first afocal anamorphic optical system 17, that is to say that the twofold magnification is in the direction of the image of outer gimbal axis 8 of gyroscope 2 formed by erecting prism 23.

The anamorphic optical system 24 may be placed in the same plane as anamorphic optical system 17 provided that it is made to work in the opposite sense ;

— an angled viewing sight 25 formed by an objective 26, an intermediate prism 27 and an eyepiece 28.

Figure 2:
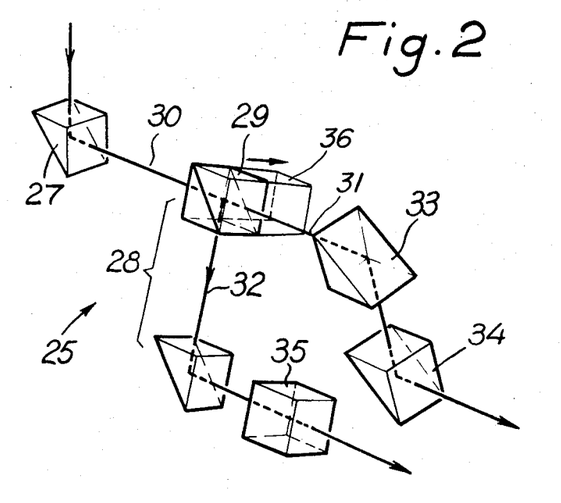
FIG. 2 is an optical diagram of an angled single-objective binocular sight.
Figure 3:
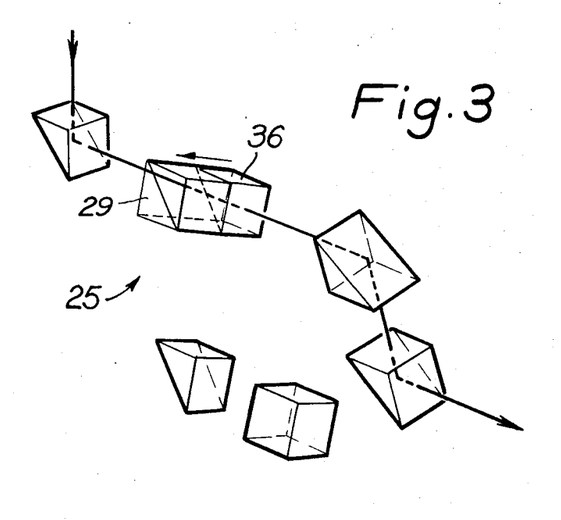
FIG. 3 shows the optical path through the sight of FIG. 2 when the same is used for monocular sighting.

Optical sight 25 is preferably a single-objective binocular sight of the kind having its optical diagram shown in FIGS. 2 and 3.

In FIG. 2, the optical sight includes an intermediate prism 27, a rhombohedron 28 comprising at its top a splitter cube 29 which splits the optical beam 30 into two optical beams 31 and 32, and two intermediate prisms 33 and 34 which deflect optical beam 31 into parallelism with beam 32, which beam passes through a cube 35 so as to cause the two optical beams 31 and 32 to have optical paths of equal length.

Splitter cube 29 is retractable and replaceable in any suitable manner and as shown diagrammatically in FIGS. 2 and 3 by a cube 36 of the same thickness. In FIG. 3, replacement cube 36 renders the sight 25 monocular in order to provide maximum clarity, for instance during twilight observations.

— a Galilean system 37 which is positioned between front mirror 10 and main objective 18 and which, when inserted into the optical path, divides the magnification of the observation instrument by its own magnification and increases the fields in the reciprocal ratio.

Figure 4:
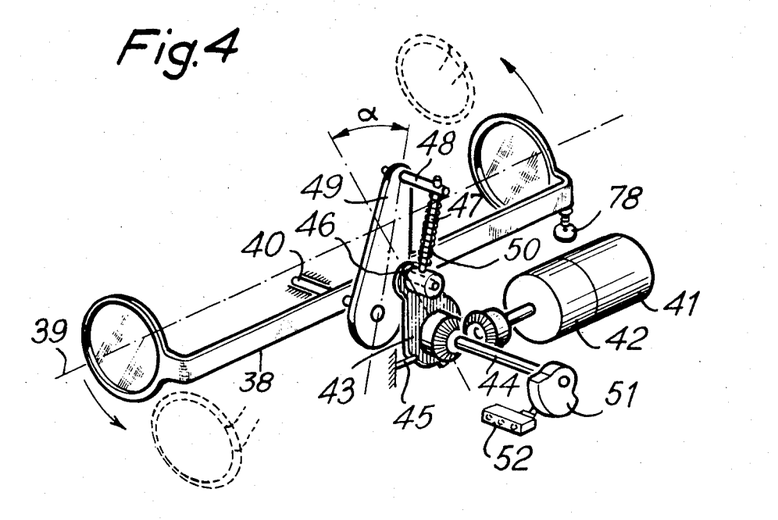
FIG. 4 schematically depicts the electromechanical field changing system.
Figure 5:
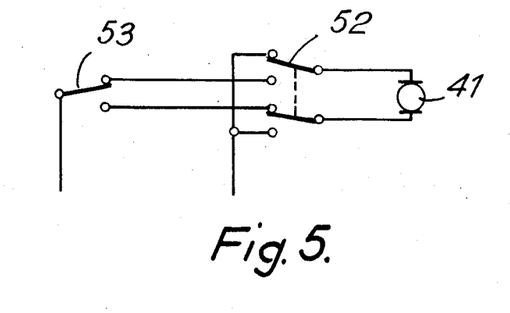
FIG. 5 is a circuit diagram of the system shown in FIG. 4.

FIGS. 4 and 5 show the electromechanical field changing system which, when required, very rapidly inserts the Galilean system 37 into the optical path of the observation instrument.

The afocal or Galilean optical system is mounted on a support 38 centered on the optical axis 39 and is capable of very rapidly pivoting about an axis 40 perpendicular to optical axis 39, through an angle such that the Galilean system occupies the position shown in dash lines.

Through reduction gear 42, an electric motor 41 energized in the appropriate sense rotates a cam 43 the rotation of which, about a shaft 44 which preferably forms an extension of shaft 40, is limited by a stop 45. Carried on the end of cam 43 is a pin 46 to which is pivotally connected a rod 47 which slidably engages into a hole formed in a pin 48 pivotally mounted on the end of an arm 49 fast with rotating shaft 40 of support 38. In the resting position, cam 43 and arm 49 are at an angle α. When cam 43 is rotated, clockwise for instance, about shaft 44, it compresses a spring 50 which surrounds rod 47 and reacts against pin 48. The force exerted by spring 50 against pin 48 causes arm 49 and support 38 to pivot about shaft 40 into the position shown in dash lines. A cam 51 carried on the end of shaft 44, which is fast with cam 43, operates a switch 52 the contacts of which reverse the sense in which motor 41 is energized, whereby, when the operator again actuates switch 53, motor 41 is caused to rotate in the opposite direction in order to reinsert the Galilean system into the optical path, and so on.

The motion of the Galilean system support 38 is damped by elastic stop means 78.

Considering FIG. 1 once more, it will be seen that any movement in elevation of the observation instrument body 54 about pivotal axis XX' of the carrier vehicle will be detected by sensor 11. Inner gimbal 5 of gyroscope 2, together with front mirror 10, remains stationary, but outer gimbal 7 tends to rotate about inner axis 6 and to thereby rotate the stator of error sensor 11. The error signals issuing from sensor 11 are amplified at 55 and activate a motor 56 which, through the agency of gear-type demultiplication means 57 for example, reset the case 9 about horizontal axis 58 in order to cancel out the error signals. The axis 58 lies along the optical beam reflected by front mirror 10. Case 9 is rotatably supported on a bearing 59 mounted in a housing 60 and in its rotation carries with it the anamorphic optical system 17 rigidly connected to it.

Any movement in azimuth of observation instrument body 54 about pivotal axis YY' of the carrier vehicle is detected by sensor 13, the gimbal 7 of gyroscope 2 remaining stationary together with front mirror 10, but as the case 9 pivots about YY' it rotates the stator of sensor 13 about outer gimbal axis 8.

The error signals issuing from sensor 13 are amplified at 61 and activate motor 62 which, through the agency of demultiplication means 63, resets the housing 60 about axis YY' whereby to cancel out these error signals. Housing 60 is supported on a bearing 64 which provides pivotal motion about axis 21 in relation to the observation instrument body 54. The case 9, the Galilean system 37, the main objective 18 and plane mirror 20 are associated to the rotation of housing 60, and axis 21 is co-extensive with the optical beam reflected by plane mirror 20.

It is to be noted that irrespective of perturbing motions of the observation instrument about its pivotal axes XX' and YY', the boresight 1 stabilized by gyroscope 2 remains fixed in space and lies at all times along the optical axis of the observation instrument.

Deflections of the boresight 1 in elevation and azimuth are obtained by appropriately energizing the torquers 16 and 15 which cause gyroscope 2 to precess about the elevation and azimuth axes respectively. The signals issuing from error sensors 11 and 13 are amplified at 55 and 61 and thereafter respectively energize the motors 56 and 62, which slave the case 9 and the housing 60 together with the respective optical equipment to the changed orientation of boresight 1.

The unlimited rotation of housing 60 about axis 21 in relation to the observation instrument body 54 provides panoramic vision in azimuth without moving the angled optical sight 25.

On the other hand, the rotation of case 9 about axis 58 is limited in order to ensure that gyroscope 2 invariably senses any azimuthal shifts about its outer gimbal axis 8. The non-observable space is formed by a cone with an apex angle of a few degrees. Erecting prism 23 is slaved about optical axis 21 by differential gearing 65 which sums the rotations of case 9 and housing 60.

A synchro system 66 connected, on the one hand mechanically within support or housing 60 to the rotation of case 9 about axis 58, and on the other hand electrically to error sensor 12, outputs the boresight elevation angle data. A second synchro system 67, connected mechanically to housing 60 and electrically to error sensor 14 outputs the boresight azimuth angle data. These data are usable for interlocking the weapon system with the boresight direction and for displaying the latter on indicator means.

Figure 6:
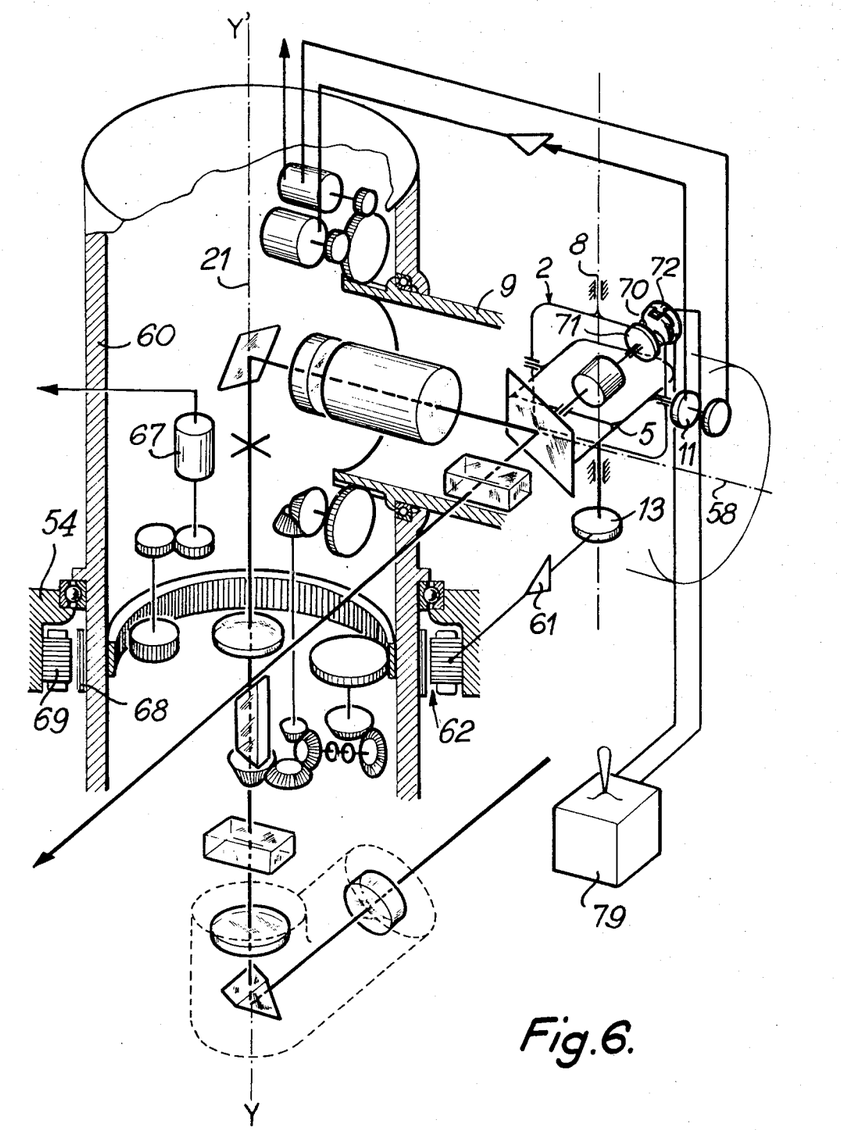
FIG. 6 shows correspondingly to FIG. 1 a gyrostabilized observation instrument according to a second embodiment of the invention.

Referring next to FIG. 6, the motor 62 which slaves the housing 60 azimuthally about axis 21 is a direct-drive motor, its rotor 68 being fixed to housing 60 and its stator 69 to the observation instrument body 54. The advantage of this arrangement is that it dispenses with the mechanical demultiplication means between the motor and housing 60 and thereby avoids the mechanical backlash which would introduce a time-lag into the servo control. Such a motor 62 reduces the friction moment and above all neutralizes the rapid perturbing motions about the axis YY' by providing a zero-speed-error servo action. In this arrangement the synchro system 67 no longer functions in the differential mode as described with reference to the preceding arrangement, that is to say that it is merely coupled mechanically to housing 60. Such an arrangement relieves the load on outer gimbal axis 8 of gyroscope 2 by eliminating the error sensor 14 of FIG. 1.

Obviously, a similar type of motor may be used to slave the case 9 about axis 58 and thereby make it possible to eliminate the error sensor 12 of FIG. 1.

In order to further reduce the inertia of gyroscope 2 and increase its nutation frequency, its precession torquers may be replaced with advantage by a single torquer 70 since relative motions between the rotor and stator of such torquer are very small by reason of the fact that case 9 and housing 60 are slaved to the orientation of gyroscope 2. By way of example, torquer 70 may be of the variable reluctance type, and its very light rotor 71 may be supported by inner gyroscope gimbal 5 and its stator 72 fixed to case 9. The rotor 71 is a spherical cap made of electrically conducting material (such as the material known by the trade-name Armco), placed in air gaps between the pole-faces of four magnetic cores energized by coils. One pair of magnetic cores is positioned in the plane formed by inner gimbal 5 of gyroscope 2 and the second pair is positioned in a plane perpendicular thereto.

Energization of one of the coils tends to attract the spherical cap whereby to close the magnetic flux and apply torque to gyroscope 2, causing the same to precess.

Alternatively, two torquers may be used, with the first having its rotor fixed to inner gyroscope gimbal 5 and the second its rotor fixed to outer gimbal 7, the stators of both torquers being supported by case 9.

Similarly, in order to reduce the inertia of the gyroscope, error sensors 13 and 11 are made low in weight since they operate about the zero point, both the case 9 and the housing 60 being slaved to gyroscope 2.

Figure 7:
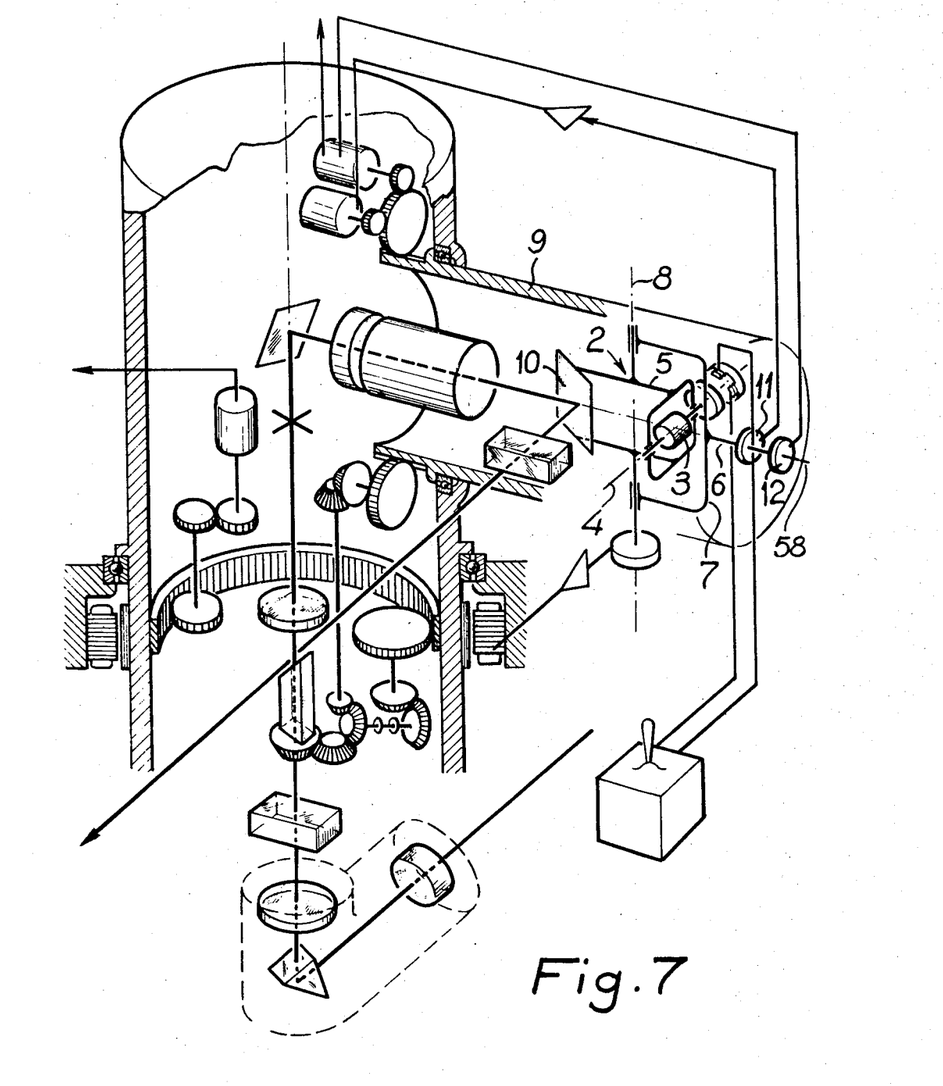
FIG. 7 shows correspondingly to FIG. 1 a gyrostabilized observation instrument according to a third embodiment of the invention.

In FIG. 7, which shows a third possible embodiment, the wheel 3 of gyroscope 2 rotates about axis 4 in the inner gimbal 5 which is able to pivot about the vertical or azimuthal axis 8 within outer gimbal 7. Outer gimbal 7 is pivotally mounted about the horizontal or elevation axis 6 within the case 9. Mounted on inner gimbal 5 is the front mirror 10 which is so positioned as to cause the optical beam reflected by it to merge with the elevation axis 6 of gyroscope 2 and with the rotation axis 58 of case 9. As shown in the drawing, the axis 8 may be offset in relation to the intersection point of axes 4 and 6 in order to balance the gyroscope two/mirror 10 compound.

Besides the fact that the elevation axis and the housing rotation axis merge with the optical axis, this arrangement has the advantage that the most heavily loaded gimbal shaft, namely the shaft 6, is the outer gimbal shaft, so that the stators of error sensor 11 and synchro system 12 are supported by the case 9.

As stated precedingly, it is possible for the gunner-observer to cause the gyroscope to precess in order to deflect the boresight, by using the control means shown in the drawing as being a box 79 equipped with a ball-jointed handle permitting simultaneous boresight deflections in elevation and azimuth.

Figure 8:
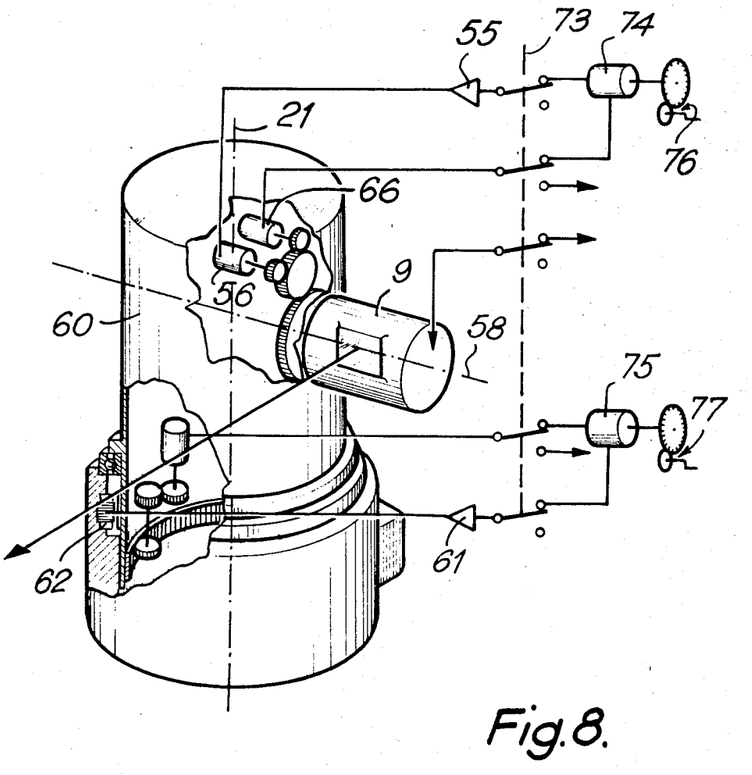
FIG. 8 is the circuit diagram permitting control of the observation instrument of FIGS. 6 and 7 from a distant post.

As shown in FIG. 8, a switch 73 cuts off the signals from the gyroscope error sensors into the elevation and azimuth servo channel amplifiers 55 and 61 and applies the information issuing from synchro systems 74 and 75 (on which an elevation and azimuth have been preset). Via the switch 73, synchro systems 74 and 75 are electrically connected to the synchro systems 66 and 67, respectively, which normally supply data to the weapon system. Switch 73 additionally controls a device (not shown) which cages the gyroscope and which is preferably an electromagnet which is caused to engage with a notch in a rod carried by the inner gimbal of the gyroscope whereby to reset and cage the gyroscope in relation to case 9.

As soon as switch 73 is operated, all the abovedescribed operations take place simultaneously and the motors 56 and 62 respectively reset the case 9 and the housing 60, to the elevation and azimuth angles set up at 76 and 77, respectively, by rotating them about the axes 58 and 21 respectively.

What is claimed is :

1. An observation instrument with panoramic vision, stabilized by a gyroscopic system having inner and outer gimbals which provide corresponding rotation axes, capable of providing accurate data on the elevation and azimuth angles of the boresight thereof and having a fixed eyepiece, comprising in combination optics including two mirrors forming a boresight and referenced to the gyroscopic system, to wit a first front plane mirror fixed directly to the inner gimbal of said gyroscopic system, set at a fixed incidence angle, having a plane parallel to the outer gimbal axis of the gyroscopic system and inclined at 45° to the inner gimbal axis of said system, and a second plane mirror referenced to the relative motion of the gyroscopic system about its outer gimbal axis, the plane of said second mirror being so disposed that it furnishes an image of said inner gimbal axis coaxilay with an axis about which maximum deflection is obtained for the boresight, and a selective magnification lens system lying along the exit pupil, and arranged between said mirrors.

2. An observation instrument according to claim 1, characterized by the fact that it includes an afocal anamorphic optical system disposed ahead of the front mirror, said anamorphic system being slaved in elevation and azimuth to said front mirror and providing a magnification of two in the direction of the plane containing the inner gimbal axis of the gyroscopic system and unit magnification in the direction of the plane containing the outer gimbal axis of said gyroscopic system.

3. An obersvation instrument according to claim 2, characterized by the fact that the optics thereof include a second afocal anamorphic system the magnification axes of which are perpendicular to those of the first-mentioned anamorphic optical system, thereby to eliminate the anamorphosis of the image obtained ahead of the eyepiece.

4. An observation instrument according to claim 2 , characterized by the fact that the afocal anamorphic system is fixed to a housing containing the gyroscopic system and pivotally mounted about a shaft on a case the axis of which is perpendicular to that of said housing, which housing is associated with servo control means therefor in respect of the relative motions of the gyroscopic system about its inner gimbal axis, the second mirror being supported by said case, which case is itself mounted for pivotal motion about its own axis on an observation instrument body and is associated with servo control means therefor in respect of the relative motions of said gyroscopic system about its outer gimbal axis.

5. An observation instrument according to claim 4, characterized by the fact that the axis about which maximum deflection of the aim axis, or boresight, is vertical, thereby providing panoramic vision in azimuth.

6. An observation instrument according to claim 4, characterized by the fact that the case pivots about a vertical axis and the housing pivots about a horizontal axis thereby providing panoramic vision in elevation.

7. An observation instrument according to claim 4, characterized by the fact that the gyroscopic system is provided with a double torquer having a rotor of very low weight supported by the inner gimbal of said system and a stator supported by the housing for said system.

8. An observation instrument according to claim 4, characterized by the fact that the gyroscopic system is associated with two torquers of which one is provided with a rotor fastened to inner gimbal of said system and the other with a rotor fastened to the associated outer gimbal, said torquers having their stators fastened to the housing containing said system.

9. An observation instrument according to claim 4, characterized by the fact that the optics thereof include an erecting prism movably mounted on the optical path and slaved to the combined motions of the housing and the case about their axes whereby to eliminate image run-out.

10. An observation instrument according to claim 4, characterized by the fact that the inner gimbal of the gyroscopic system is mounted on horizontal pivots, the outer gimbal being mounted on verticla pivots, the front mirror being supported by said inner gimbal at a position causing it to provide off the incident optical beam a reflected beam which has its axis co-extensive with the outer gimbal hinge line, the slaved position of which is co-extensive with the hinge line of the pivotal housing which contains the gyroscopic system and is slaved thereto, the plane of said front mirror being parallel to said outer gimbal hinge line and forming a fixed angle of 45° to the hinge line of said inner gimbal.

11. An observation instrument according to claim 4, characterized by the fact that motors for servo controlling said case and housing are associated to synchro systems for exploiting and presetting the boresight elevation and azimuth angles from a distance.

12. An observation instrument according to claim 1, characterized by the fact that it is provided with a single-objective binocular sight comprising, between the objective and the eyepieces, a rhombohedron comprising a splitter cube which splits the optical beam into two beams that travel to the two eyepieces respectively, said splitter cube being retractably mounted and being replaceable by an ordinary cube of the same thickness.

13. An observation instrument according to claim 1, characterized by the fact that the field-changing selective magnification lens system is a snap-acting retractable Galilean system interposed ahead of the objective.

14. An observation instrument according to claim 13, characterized by the fact that the Galilean system is mounted on a rocking member connected to a crank cooperating with an arm through a spring tumbler mechanism, said arm being actuated by a reversible motor and having its motions limited by stop means and fastened through a cam for actuating a switch that reverses the direction of rotation of a motor, said switch being series-connected to a further switch in the motor power-supply circuit.

* * * * *